United States Patent Office 3,065,337
Patented Nov. 20, 1962

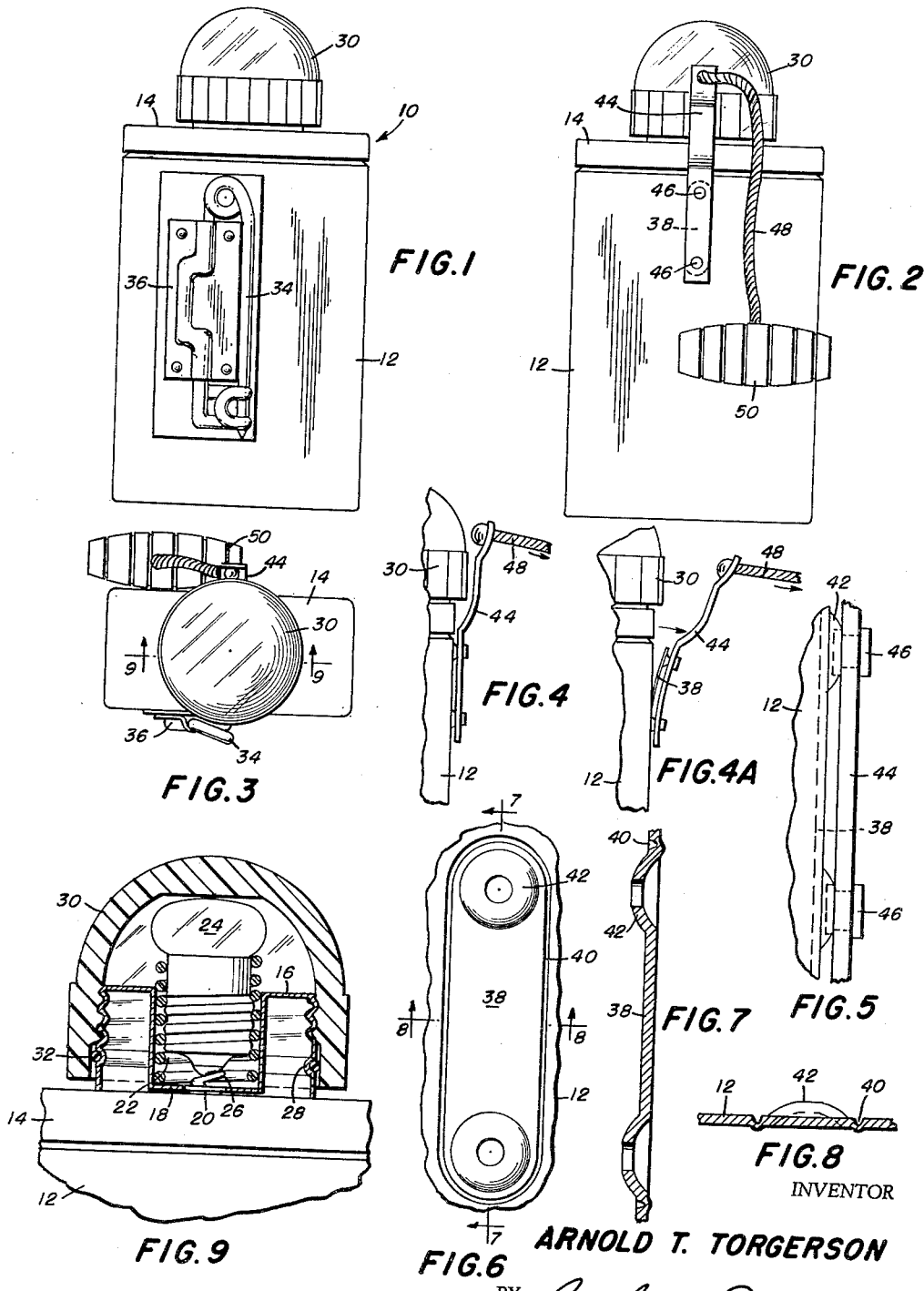

3,065,337
FLASHLIGHT
Arnold T. Torgerson, Madison, Wis., assignor to The Electric Storage Battery Company, Philadelphia, Pa., a corporation of New Jersey
Filed Sept. 26, 1958, Ser. No. 763,662
5 Claims. (Cl. 240—10.65)

This invention relates to a flashlight. More specifically, this invention relates to a flashlight employing a reserve type primary dry cell battery.

Because the "Lechlanché" cell is susceptible to deterioration during long periods of storage, it is not satisfactorily adapted to serve as an emergency light to be in stand-by storage for a long period of time until possible emergency use. As a substitute for the "Lechlanché" cell, the prior art teaches the use in such an emergency light of a reserve type primary dry cell.

Most reserve type cells of the prior art comprise a housing enclosing all the components of the cell with the electrolyte segregated. The electrolyte is kept adjacent the other components, in a container adapted to be broken open at the time of use to allow its escape to activate the cell. For use as an emergency light at sea there has been developed a reserve type cell which does not carry the electrolyte but for which ordinary seawater may be the electrolyte. In the latter type light the housing itself is opened to permit seawater to enter, activating the cell. In condition of stand-by storage, such a light is advantageously less heavy by the considerable weight of the electrolyte. It is, hence, better adapted for use by sailors and airmen. A flashlight featuring such a cell is described in the Patent No. 2,896,067, which issued July 21, 1959, to Lee J. Lockwood, assigned to a common assignee with this application.

To be acceptable for use as an emergency light at sea, the housing of such a light must be easily openable. At the same time the opening means must provide a hermetic seal for the housing while the light is in stand-by storage, and it must require enough force to open to preclude easy, accidental opening. Because it is a piece of equipment upon which a life may depend, it is imperative that the force required to open the housing assuredly and predictably be within the desired range—not too great and not too slight. This assuredness and predictability of the force required to open have not characterized some of the devices heretofore developed.

It is, therefore, an object of this invention to provide in such a portable light an opening means wherein the hermetic seal of the casing during the period of stand-by storage is assured.

It is a further object of the present invention to provide in an emergency light for use at sea opening means whereby the force required to open the housing to admit actuating fluid is assuredly within a desired range—not too great and at the same time not too slight—and does not vary greatly from housing to housing.

A further object of this invention is to provide a portable light having a reserve type cell with a hermetically sealed container adapted to be opened by means which are simple and inexpensive to produce yet thoroughly reliable.

A still further object of this invention is to provide a portable light having novel sealing means assuring against entry of water in the light bulb area.

This invention embodies other novel features, details of construction and arrangement of parts which are hereinafter set forth in the specification and claims and illustrated in the accompanying drawing wherein:

FIG. 1 is a rear elevational view of a preferred, but illustrative, form of flashlight in accordance with the invention;

FIG. 2 is a front elevational view;

FIG. 3 is a top plan view;

FIG. 4 is a fragmentary side elevational view showing the rupture arm of a flashlight according to the invention before rupture;

FIG. 4a is a fragmentary side elevational view, like FIG. 4, but after the rupture;

FIG. 5 is an enlarged fragmentary side elevational view showing the rupture area;

FIG. 6 is a fragmentary front elevational view with the rupture arm removed to show the rupture area;

FIG. 7 is a sectional view taken on the line 7—7 of FIG. 6;

FIG. 8 is a sectional view taken on the line 8—8 of FIG. 6; and

FIG. 9 is an enlarged fragmentary sectional view taken on the line 9—9 of FIG. 3.

Briefly, the invention is a portable light adapted to serve as an emergency light at sea and comprising a housing having a bulb mounted therein and containing some of the components of a reserve cell. The housing has an area in a wall thereof surrounded by a channel which weakens the wall in the periphery of the area, and means are provided to tear the area out of the wall along the channel. Removal of the area permits the entrance of a fluid adapted to serve as the electrolyte of the cell and to thereby activate the light.

More specifically, referring to the drawings, a flashlight embodying the invention is shown in FIG. 1 and designated 10. It may comprise a rectangular housing 12 having four connected side walls and a bottom wall. The housing contains the components of a reserve-type cell, complete except for the presence of an electrolyte. Fitting in sealed condition over the top of the housing is a closing cover or lid 14 on which is secured the light mounting means comprising an inverted cup-shaped member 16. The mounting means has a well in the center thereof and the bottom wall 18 of the well is centrally apertured and fitted with a disk 20 of insulating material. The well receives in firm abutment from above (see FIG. 9) a spiral spring 22, the bottom end of which abuts the bottom wall 18 of the well and which is wound about a conventional screw type base bulb 24. A lead from one of the electrodes within the housing is electrically connected by means not shown to the cup-shaped member 16 whereby a charge is imparted to the screw base of the lamp 24. A lead from the other electrode to complete the flashlight circuit extends through the insulating disk and terminates in a central tip contact 26 for lamp 24.

The sidewall of the cup-shaped member 16 is coarsely threaded at its upper end and is formed with an annular groove 28 adjacent its lower end. A red tinted transparent or translucent dome 30 is interiorly threaded and is received over the cup-shaped member in threaded engagement therewith. In the annular groove is positioned an O-ring 32 which contacts the inside of the dome below the threads to seal the light area under the dome against entrance of seawater or moisture.

The back of the rectangular housing mounts a clasp 34 of the enlarged safety pin type adapted to be secured to the apparel of the user. The mounting is accomplished by a plate 36 appropriately channeled to conform to the back of the clasp and secured to the housing. As shown in FIG. 1, the back of the clasp is formed with an offset portion to prevent rotation of the clasp in its holder. The clasp 34 is of such size and proportion that it is able to withstand a considerable pull or tug in an outward direction while still maintaining firm hold on the apparel.

The front wall of the housing comprises an oval elongate area 38 surrounded by a channel 40, weakening the wall thereabout. The channel is preferably formed by stamping, and also within this area outwardly projecting humps 42 are stamped or otherwise formed, each hump featuring an aperture in its center. A rupture arm 44 comprises a rigid strip of metal and is secured to the rupture area by means of rivets 46 extending through the apertures and peened over on the opposite side thereof. As shown in FIG. 4, the arm is deflected outwardly adjacent the upper end thereof to avoid interference with the periphery of the dome. The upper end of the arm is apertured and receives a lanyard 48 mounted on the inside of the arm 44 to secure it. The opposite end of the lanyard is equipped with a handle 50 comprising a cross member fastened to the line and grooved for gripping.

When it is desired to use the flashlight of my invention, the handle 50 is gripped and given a sharp tug which pulls the rupture arm out from the dome and tears the rupture area 38 away from the front wall along the weakened channel. The rupture starts in the channel 40 at the upper end of the rupture area and extends down toward the lower end. With the rupture area torn away, fluid, such as seawater, capable of activating the reserve cell within the housing, may enter. The result is the illumination of the bulb. It has been found that for easiest rupture, the rupture area is best formed with a rather small radius in the channel 40 at the upper end thereof. In a preferred form the radius is 7/64ths inch wherein the thickness of the wall itself may be about 1/32nd of an inch or less.

Electrical energy for flashlights of the present invention may be furnished by any suitable reserve type primary dry cell. Primary dry cells of the reserve type are well known in the art and are characterized by retaining the electrolyte or activating fluid out of contact with the active cell elements until it is desired to place the cell in operation. A particularly suitable reserve cell for use in the present invention is the water-activated system of cuprous chloride-magnesium. The negative electrode of the cell is preferably formed of a length of magnesium tubing. Around the outside surface of the magnesium is wrapped an electrolyte absorbent material such as vinyon, rayon or webril. The positive electrode element is suitably a bronze screen coated with a cuprous chloride paste made up with polystyrene paste solution. The positive screen is wound over the electrolyte absorbent to form a cell assembly of cylindrical shape having a hollow central bore. The cell assembly may then be inserted within the open end of the housing.

It has been noted that the force required to open the housing made according to the embodiment of the invention described here is substantially uniform from housing to housing. Thus, the undesirable characteristic of markedly varying degrees of force being required to open housings of emergency lights heretofore developed is eliminated. As another attraction the opening means as described in this embodiment of my invention is extremely simple and inexpensive to produce.

While this invention has been shown in one form, it will be obvious to those skilled in the art that it is not so limited but is susceptible of various changes and modifications without departing from the spirit and scope of the claimed invention.

I claim:

1. A battery-operated portable light comprising a closed housing, said housing mounting a light bulb, said housing containing all of the components of an inactive reserve cell, means electrically connecting said components to said light bulb, a weakening channel formed in the wall of said housing, said channel enclosing and defining a rupture area, a portion of said weakening channel comprising a configuration of relatively small radius compared with the longest dimension of said rupture area, a relatively rigid rupture arm attached to the outside of said wall within said rupture area at a point adjacent to said relatively small radius of said channel, said arm extending from said point of attachment beyond said rupture area, whereby said arm may be used to tear said rupture area way from the rest of said wall of said housing along said weakening channel, the tear commencing at said small radius, thereby opening said housing to permit entrance of a cell-activating fluid into said housing.

2. A battery operated portable light according to claim 1, in which said rupture area is of elongate shape, and in which said rupture arm extends generally parallel to the long dimension of said rupture area and is attached to the outside of the wall at two spaced points within said rupture area.

3. A reserve battery-operated portable light comprising a sealed housing, a portion of said housing having a light bulb mounted therein, said housing containing all of the components of a reserve cell except electrolytic liquid, said cell having leads electrically connected to the terminals of said light bulb, a weakening channel formed in the wall of said housing, said channel enclosing and defining a rupture area, a portion of said weakening channel comprising a configuration of relative small radius compared with the longest dimension of said rupture area, a relatively rigid rupture arm attached to the outside wall within said rupture area at a point adjacent to said relatively small radius of said channel, said arm extending from said point of attachment beyond said rupture area, a lanyard means attached to the extremity of said arm, whereby said arm may be used to tear the rupture area away from the wall of said housing along said channel thereby forming an opening in said housing to permit entrance of a cell activating fluid into said housing through said opening.

4. A reserve battery-operated portable light comprising a sealed, water impervious housing, an inverted cup-shaped light bulb-mounting member secured to one wall of said housing, a light bulb mounted on said light bulb-mounting member, said light bulb-mounting member being externally threaded adjacent the upper end thereof and having an annular groove adjacent the lower end thereof, a sealing member in said groove, a dome internally threaded adjacent its mouth and surmounting said light bulb, said dome threadly engaging the said external threads on said light bulb mounting member and engaging said sealing member in sealing relation thereby sealing the interior of said dome from water exterior thereof, said housing having a water impervious barrier between the interior of said housing and said light bulb and containing all of the elements of an inactivated reserve cell, said cell having its terminals electrically connected to the terminals of said light bulb, a weakening channel formed in the wall of said housing, said channel enclosing and defining a rupture area, a portion of said weakening channel comprising a configuration of relatively small radius compared with the longest dimension of said rupture area, a relatively rigid rupture arm attached to the outside of said wall within said rupture area at a point adjacent to said relatively small radius of said channel, said arm extending from said point of attachment beyond said rupture area, whereby said arm may be used to tear the rupture area away from the rest of said housing along said channel thereby opening said housing to permit entrance of a cell-activating fluid into said housing.

5. A reserve battery-operated portable light comprising a sealed container, all surfaces of which are impervious to water and moisture, and which contains at least one inactivated reserve cell, said cell having electrodes of opposite polarity, a housing mounted on said container but sealed off therefrom and forming a compartment within which is mounted a light bulb, the terminals of said light bulb being electrically connected respectively to said electrodes of opposite polarity, means for sealing said housing exterior of said container to prevent water and moisture from entering said bulb-containing compartment from the exterior thereof, means for activating said reserve cell at will by introducing water into said sealed container, said means for activating comprising a weakening channel formed in the wall of said housing, said channel enclosing and defining a rupture area, a portion of said weakening channel comprising a configuration of relatively small radius compared with the longest dimension of said rupture area, a relatively rigid rupture arm attached to the outside of said wall within said rupture area at a point adjacent to said relatively small radius of said channel, said arm extending from said point of attachment beyond said rupture area, and a lanyard means connected to the extended portion of said arm, whereby a moderate pull on the lanyard in a direction away from said container wall operates to dislodge said rupture area and permit the ingress of cell-activating water to the interior of said container.

References Cited in the file of this patent
UNITED STATES PATENTS

| | | |
|---|---|---|
| 2,070,818 | Winckler | Feb. 16, 1937 |
| 2,213,428 | Heise et al. | Sept. 3, 1940 |
| 2,224,742 | Muldoon | Dec. 10, 1940 |
| 2,249,691 | Gelardin | July 15, 1941 |
| 2,268,878 | Kopp | Jan. 6, 1942 |
| 2,355,247 | Slocum | Aug. 8, 1944 |
| 2,410,535 | Van Daalen | Nov. 5, 1946 |
| 2,536,408 | Addicks | Jan. 2, 1951 |
| 2,763,706 | Barrett | Sept. 18, 1956 |
| 2,837,630 | Shen | June 3, 1958 |
| 2,896,067 | Lockwood | July 21, 1959 |

FOREIGN PATENTS

| | | |
|---|---|---|
| 562,671 | France | Sept. 12, 1923 |
| 246,740 | Great Britain | Feb. 14, 1926 |
| 679,186 | Great Britain | Sept. 17, 1952 |